United States Patent [19]
Smith et al.

[11] Patent Number: 5,542,794
[45] Date of Patent: Aug. 6, 1996

[54] MULTI-HANDED MILLING CUTTER HAVING INDEXABLE WEDGES AND INSERTS

[75] Inventors: William E. Smith, Wilson; Scott W. Vogel, Fuquay-Varina; Robert L. Shomaker, Raleigh, all of N.C.

[73] Assignee: Kennametal Inc., Latrobe, Pa.

[21] Appl. No.: 336,640

[22] Filed: Nov. 9, 1994

[51] Int. Cl.$^6$ ........................................................ B23C 5/22
[52] U.S. Cl. .................................................. 407/35; 407/61
[58] Field of Search ............................... 407/34–42, 49, 407/51, 52, 55, 61

[56] References Cited

U.S. PATENT DOCUMENTS

| | | | |
|---|---|---|---|
| 83,963 | 11/1868 | Hickok et al. | |
| 1,650,290 | 11/1927 | Metzger | 407/35 |
| 1,762,875 | 6/1930 | Metzger | 407/37 |
| 1,927,409 | 9/1933 | Markstrum | 29/105 |
| 3,359,612 | 12/1967 | Mina | 29/105 |
| 3,535,759 | 10/1970 | Mueller | 407/41 |
| 4,330,227 | 5/1982 | Raye et al. | 407/36 |
| 4,529,338 | 7/1985 | Erkfritz | 407/35 |

Primary Examiner—M. Rachuba
Assistant Examiner—Kenneth J. Hansen
Attorney, Agent, or Firm—James G. Porcelli

[57] ABSTRACT

A milling cutter for cutting a workpiece in both right and left-handed rotary directions is provided that comprises a rotatable cutter body having at least one pair of right and left-handed insert seats disposed on its periphery, an indexable wedge for each pair of right and left-handed insert seats, and a mounting screw for each of the wedges for securing the wedges in a clamping position with respect to a right or left-handed insert seat. Each of the wedges may be used to secure an insert in the right or left-handed seat of its respective seat pair by loosening or removing the mounting screw, and turning the wedge 180°. Each wedge includes a front end for wedgingly engaging an insert in either the right or left-handed seat, and a back end for wedgingly engaging an opposite surface of the unused insert seat in order to more securely clamp the insert in place. The back end of each wedge includes an offset portion that is receivable in and semi-complementary in shape to the unused insert seat for still more stability.

17 Claims, 3 Drawing Sheets

MULTI-HANDED MILLING CUTTER HAVING INDEXABLE WEDGES AND INSERTS

BACKGROUND OF THE INVENTION

This invention generally relates to milling cutters, and is specifically concerned with a milling cutter capable of cutting a workpiece in both right and left-handed rotary directions.

Milling cutters for cutting and shaping metal workpieces have been known in the prior art for many years. Such milling cutters generally comprise a cylindrical cutter body having a plurality of insert seats spaced around its outer periphery. Cutting inserts can be mounted within the insert seats by means of metal wedges, which are often secured to the cutter body by screws. In the vast majority of prior art milling cutters, the insert seats are oriented so that the inserts mounted therein will effectively cut a workpiece when the cutter body is rotated in a right-handed or counterclockwise direction as viewed from the cutting end of the cutter. The right-handedness of most milling cutters follows from the fact that most drive trains for such cutters are designed to rotate in a counterclockwise direction.

While most manufacturing concerns have traditionally preferred the use of right-handed milling cutters to perform their particular workpiece shaping operations, there is a growing demand for left-handed milling cutters. For example, in some of the machining operations presently used in the manufacture of engine blocks in the automotive industry, it is desirable for two or more milling cutters to simultaneously cut and shape opposite ends of the metal forming the block. It is further desirable that the cutting insert mounted in both of the cutters should cut the metal in what is known in the art as a "climb milling" orientation wherein the metal chips are cut to maximum thickness at the time the cutting edge of each insert initially engages the workpiece, in contrast to a "conventional milling" orientation, wherein there is a zero chip thickness when the cutting edge of each insert initially engages the workpiece. Such a climb milling orientation is preferred as it reduces the friction associated with the cutting operation, and extends the lives of the inserts mounted in the cutter body. However, if two right-handed milling cutters are simultaneously used to machine opposite ends of, for example, a metal workpiece being shaped into an engine block, one of the cutters will have to engage the metal workpiece in a disadvantageous conventional milling orientation.

As a right-handed cutter cannot effectively cut in a left-handed rotary direction due to the highly negative rake angles that the cutting inserts would present to the work surface, left-handed milling cutters have been developed to allow metal fabricators to perform such opposite ended cutting operations. However, due to the limited production runs of left-handed cutters, they are generally more expensive to purchase or replace than right-handed milling cutters. The manufacturing concern that purchases a number of such left-handed cutters to perform a specialized cutting operation may have no use for such cutters after the production run that necessitated the purchase has ended. Hence the conventional solution of merely purchasing and using left-handed cutters whenever the need arises is always expensive, and often inefficient as it ultimately results in the carrying of an inventory of infrequently used left-handed milling cutters.

Clearly there is a need for an ambidextrous milling cutter that is easily and conveniently capable of cutting metal in either a right or left-handed rotary direction. Such a cutter should be able to easily and effectively secure cutting inserts in either a left or right-handed orientation around the periphery of the cutter body. Finally, some sort of means should be provided for easily and conveniently changing the inserts from a right to a left-handed orientation and vice versa on the cutter body with a maximum amount of mechanical security, and a minimum expenditure of time, effort, and parts.

SUMMARY OF THE INVENTION

Generally speaking, the invention is a milling cutter capable of cutting a workpiece in both right and left-handed rotary directions that solves the aforementioned problems associated with the prior art. The milling cutter comprises a rotatable cutter body having at least one pair of adjacent insert seats, including first and second seats for receiving inserts in right and left-handed cutting orientations, respectively; a wedge for securing an insert in either of said first or second seats of said pair of insert seats, and a means for detachably mounting the wedge to the cutter body in a wedging position with respect to an insert received in either the first or second seat of the pair.

In the preferred embodiment, the rotatable cutter body has a cylindrical shape that includes a plurality of pairs of adjacent left and right-handed insert seats spaced around the periphery. A wedge is provided for each pair of insert seats which is indexable, i.e., capable of wedging an insert in either the right or left-handed seat of its respective seat pair when turned 180°. The preferred mounting means for each of the wedges is a single screw having right and left-handed screw threads on either end for engaging a threaded bore in the wedge and an opposite-handed threaded bore provided on the body of the milling cutter in the space between the right and left-handed insert of each pair. Each wedge includes a front end for wedgingly engaging an insert into one of the two insert seats, and a back end that wedgingly engages an opposing face of the insert seat not in use. Preferably, the back end of each wedge includes an offset portion to increase the area of the surface-to-surface contact between the wedge and the opposing face of the unused insert seat. The resulting broad area of contact increases the mechanical stability of the wedge and the insert engaged by the front end of the wedge.

In the preferred embodiment, the right and left-handed insert seats of each pair are canted at equal and opposite angles with respect to a line that intersects the axis of rotation and forms the centerline of a wedge mounting screw such that the engaging surface of the offset portion of the corresponding wedge flatly contacts the opposing face of the unused insert seat to the same extent in either wedging orientation.

The milling cutter of the invention provides a cutter whose inserts are readily changeable from a right to a left-handed orientation by the simple expedient of loosening and removing the clamping wedges around the periphery of the cutter body, changing the inserts to the opposite seat of each pair of seats turning the wedges 180°, and then remounting the wedges onto the cutter body by tightening down on the mounting screw or other means used to retain the wedge in place.

BRIEF DESCRIPTION OF THE SEVERAL FIGURES

Figure 3:
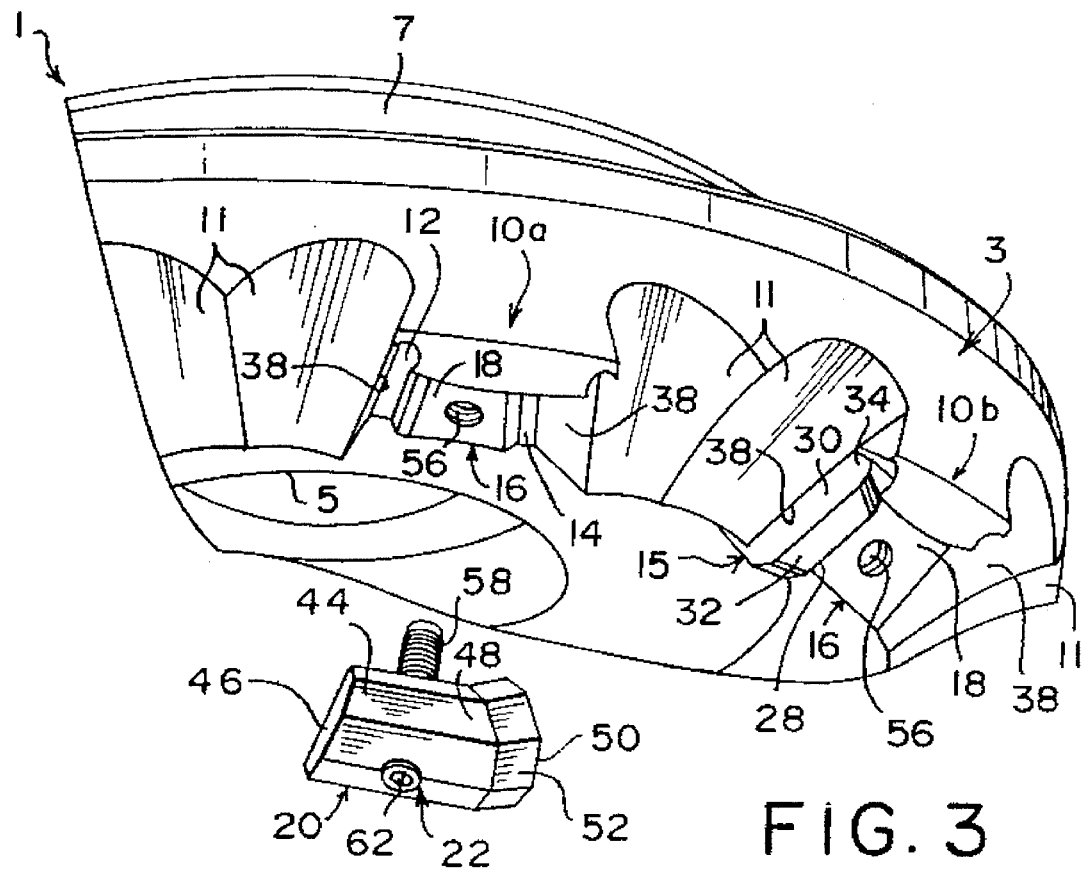
FIG. 3 is a partial perspective, exploded side view of the milling cutter of FIG. 1 illustrating two of the eight pairs of insert seats of the cutter and how the indexable wedges of the invention are received between each pair of insert seats to secure an insert in either a right-handed or left-handed cutting orientation.
Figure 4:
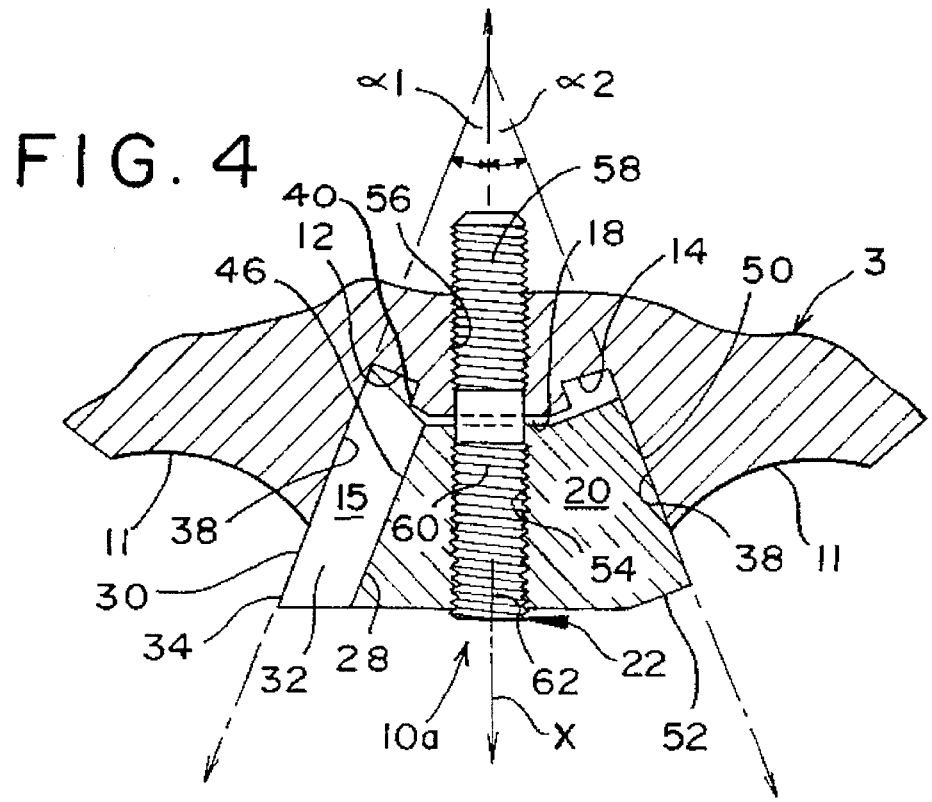
Figure 5A:
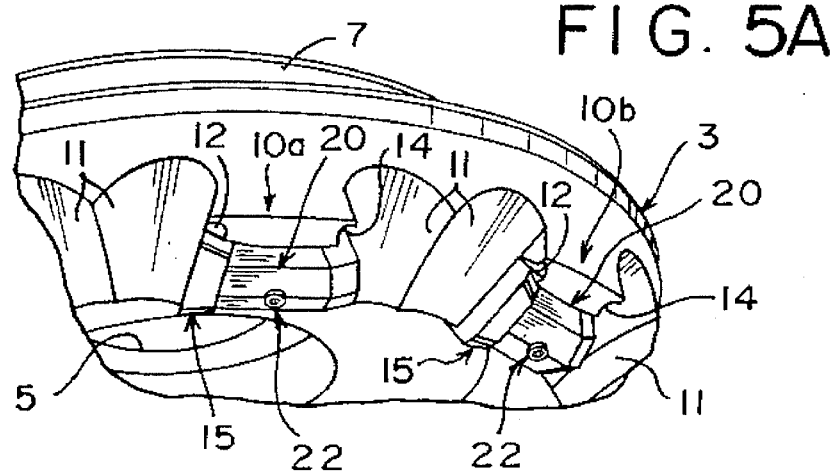
Figure 5B:
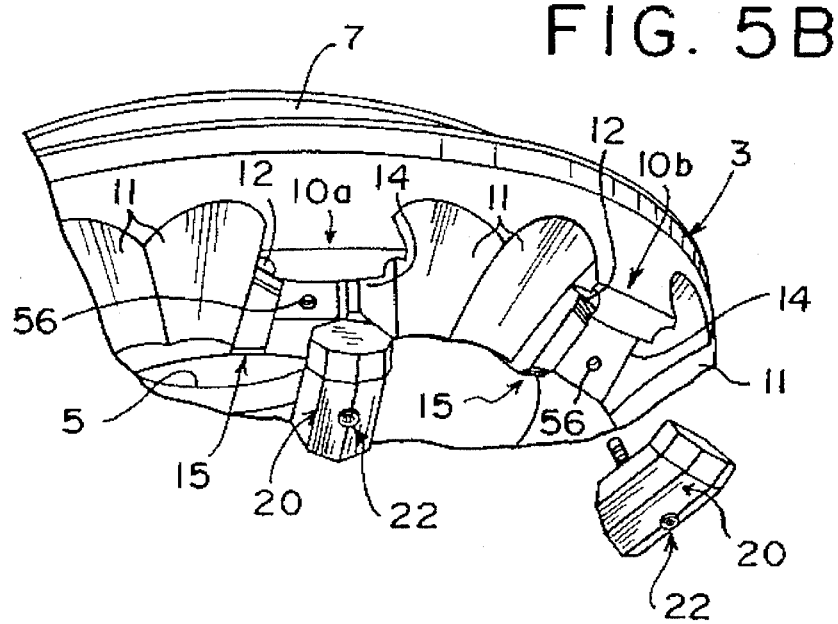
Figure 5C:
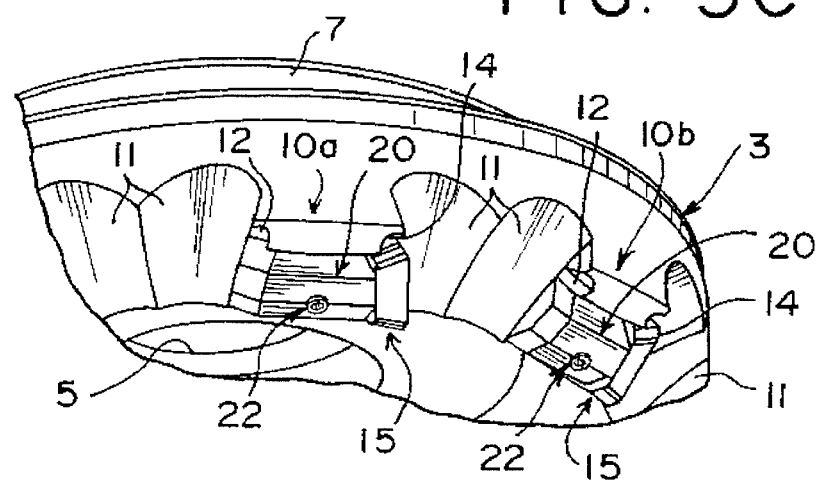

FIG. 4 is a cross-sectional side view of the insert seat pair illustrated in FIG. 3 with its respective wedge and insert assembled therein, and FIGS. 5A, 5B, and 5C illustrate how the indexable wedges of each of the pair of insert seats may be loosened, removed, and rotated 180° and then reassembled in order change the insert associated with each seat pair from a right-handed to a left-handed cutting orientation.

DETAILED DESCRIPTION OF THE PREFERRED EMBODIMENT

Figure 1:
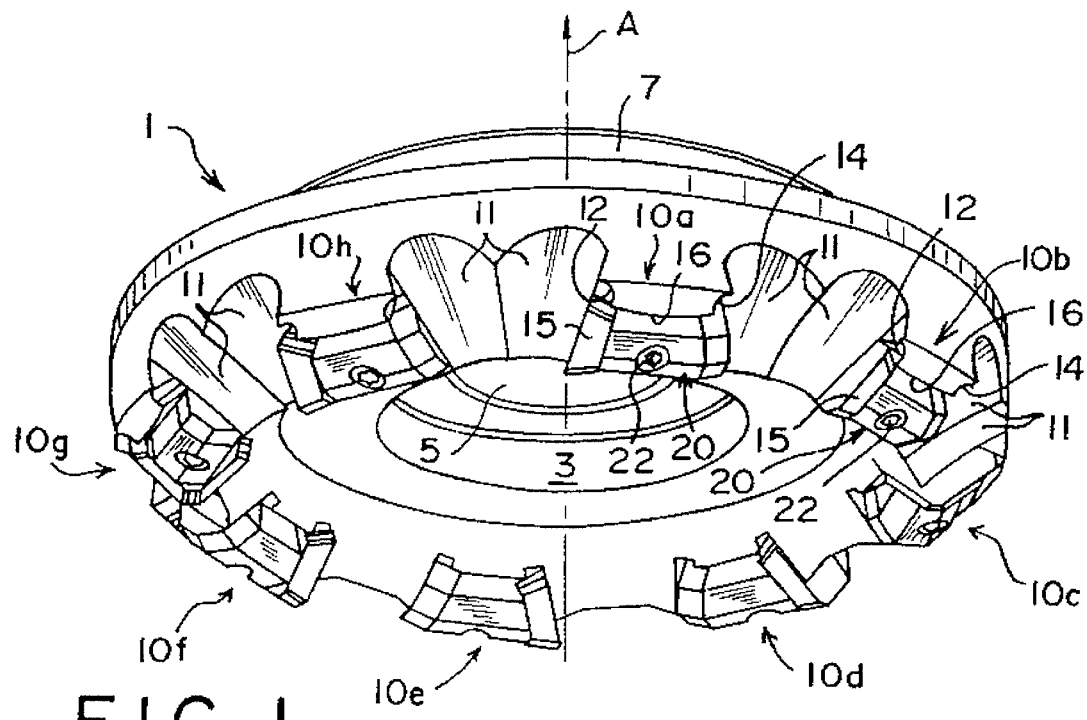
FIG. 1 is a side perspective view of a preferred embodiment of the milling cutter of the invention.
Figure 2:
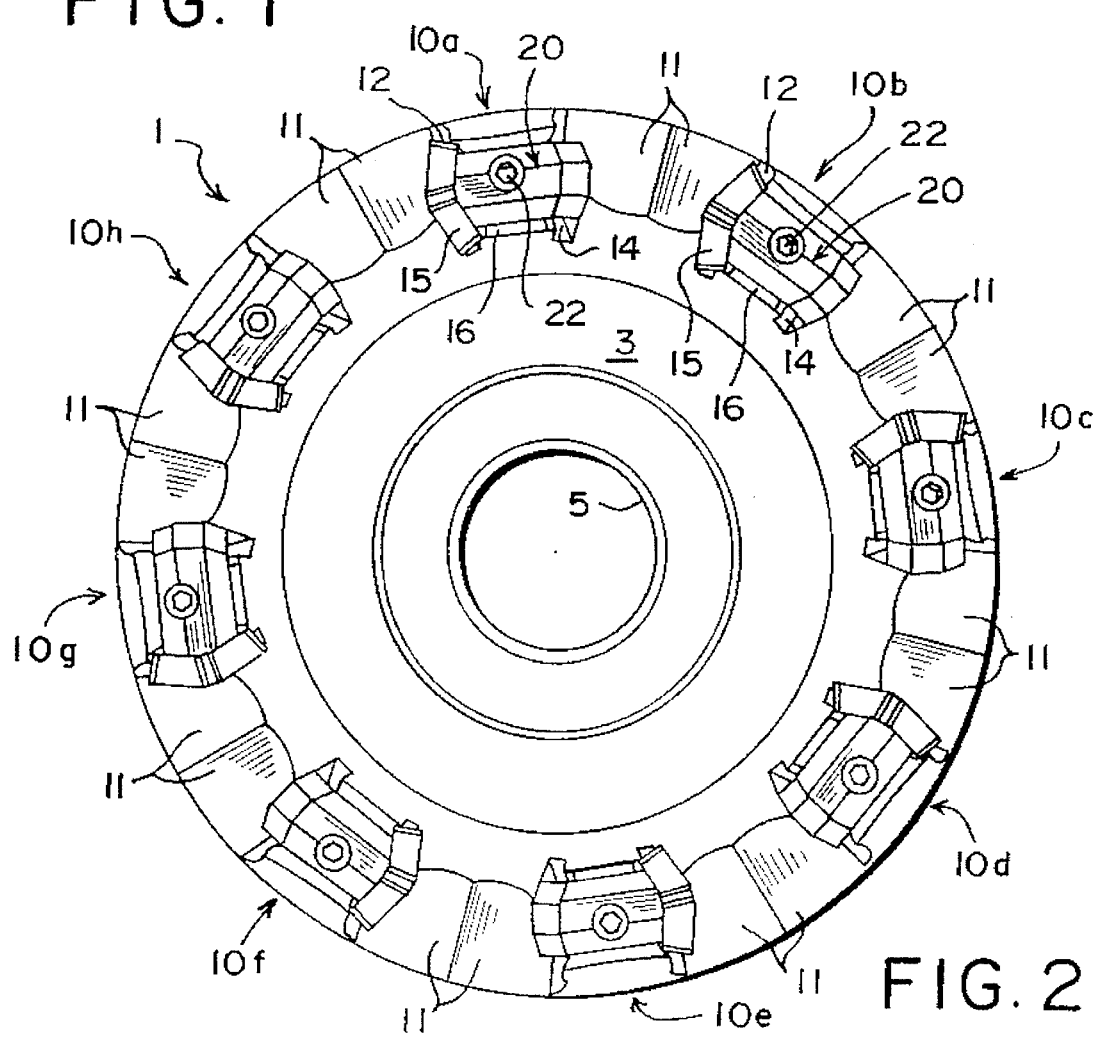
FIG. 2 is a bottom plan view of the milling cutter illustrated in FIG. 2.

With reference to FIGS. 1 and 2 wherein like numerals designate like components throughout all the several figures, the milling cutter 1 of the invention generally comprises an annular, rotatable body 3 having a circular aperture 5 concentrically disposed along its axis of rotation A for receiving a drive spindle (not shown). An annular flange 7 having driving slots (not shown) is provided for securing the rotatable body 3 to the drive spindle. The rotatable body 3 of the cutter 1 is preferably formed from 4140 steel, although a number of different grades of steel may also be satisfactorily used.

The cutter 1 of the invention includes at least one, and preferably several pairs 10a–h of insert seats as shown. While the cutter 1 in the instant example includes eight such pairs of seats, the cutter of the invention may include as few as one pair and as many as 36 or more pairs depending upon the diameter of the annular rotatable body 3. Disposed on either side of each pair 10a–h of insert seats are chip gullets 11. The gullets 11 increase the cutting effectiveness of the milling cutter 1 by providing a radially scalloped surface adjacent to inserts mounted in the insert seat pairs 10a–h that direct and radially expel metal chips created by the rake surfaces of the inserts.

With reference now to FIGS. 1 and 3, each of the insert seat pairs 10a–h includes a right-handed insert seat 12 and a left-handed insert seat 14 for orienting for receiving an insert 15 in a right-handed and left-handed orientation, respectively. The right and left-handed seats 12, 14 of each seat pair 10a–h are separated by a recess 18 for receiving an indexable wedge 20. In the preferred embodiment, each of the wedges 20 is an octagonal prism, and each of the wedge receiving recesses 18 of the seat pairs 10a–h has an annular shape that is semi-complementary to the shape of the bottom portion of each wedge 20. Each of the wedges 20 is securely held in place between the left and right-handed seats 12, 14 of each seat pair 10a–h by means of a mounting screw 22.

FIGS. 3 and 4 illustrate the specific manner in which the wedge 20 of each of the insert seat pairs 10a–h functions to wedgingly secure an insert 15 in either the right or left-handed insert seat 12, 14. As may best be seen in FIG. 4, each insert includes a back surface 28 and a front surface 30 that are interconnected by means of a tapered side surface 32. A cutting edge 34 for cutting metal is defined at the intersection between the edge of the front surface 30, and the tapered side surfaces 32. In the preferred embodiment, all of the inserts 15 are the same length, width, and height so that the cutting edges 34 of the various inserts 15 will engage a metal workpiece substantially uniformly. Such a uniform cutting action advantageously causes the edges 34 of the various inserts to wear uniformly. Each of the seats 12, 14 of each seat pair 10a–h includes a clamping surface 38. As between the right and left-handed seats 12, 14 of each seat pair 10a–h, the clamping surfaces 38 are canted at equal but oppositely-disposed angles α1 and α2 with respect to a line X that preferably intersects with or is parallel to the axis of rotation A of the cutter 1, and forms the centerline of wedge mounting screw 22. As will be explained in more detail hereinafter, the congruency of the angles α1 and α2 is one of the structural features of the invention that contributes to the indexability of the wedge 20 associated with each of the insert seat pairs 10a–h. Each of the wedges 20 includes a front end 44 having a flat, clamping and wedging surface 46, and a back end 48 that also has a flat, clamping and wedging surface 50. Preferably, the back end 48 of the wedge 20 includes an offset portion 52 whose back portion terminates in the flat, clamping and wedging surface 50. Each wedge 20 further includes a bore 54 having a left-handed thread, while the surface 16 associated with the recess 18 between each pair of insert seats 10a–h has a bore 56 having a right-handed thread. The mounting screw 22 that secures the wedge 20 in the recess 18 between the seats 12, 14 of each insert seat pair 10a–h includes at its distal end a right-handed thread 58, and at its proximal end a left-handed thread 60. The proximal end of the mounting screw 22 may terminate in an allen head socket 62 as shown or any other mechanical drive coupling.

The operation of the wedge 20 may best be appreciated with respect to FIG. 4. In this Figure, an insert 15 is placed within the right-handed insert seat 12 of an insert seat pair 10a, with its front surface 30 in planar engagement against the clamping surface 38 and a planar side surface 32 engaged against a portion 40 of the cutter body 3. The canted orientation of the clamping surface 38 with respect to the line X imparts a positive rake angle to the cutting edge 34 of the insert 15, thereby allowing it to cut more efficiently then if the resulting rake angle were either zero or negative. When the mounting screw 22 is turned clockwise, the right-handed threads 58 on the distal end of the screw 22 draws the screw 22 into the body 3 of the milling cutter 1, while the left-handed threads 60 forcefully pull the wedge 20 into the wedge receiving recess 18 between the insert seats 12, 14. This action in turn wedgingly draws the front and back surfaces 46 and 50 of the wedge 20 against the back surface 28 of the insert 15 and the clamping 38 of the unused insert seat 14, respectively. Hence, the wedge 20 is able to tightly compress the insert 15 between its front surface and the clamping surface 38 of the right-handed insert seat 12. This arrangement allows most of the force created upon the insert 15 from a machining operation to be transmitted to the clamping surface 38 of the unused left-handed insert seat 14 rather than the shaft of the screw 22. It should be noted that the shape of the offset portion 52 located at the back end 48 of the wedge 20 allows for a broader interface between the back end of the wedge 20 and the opposing clamping surface 38 of the unused insert seat 14.

The multi-handed operation of the milling cutter 1 of the invention is best appreciated with respect to FIGS. 5A through 5C. In FIG. 5A, the inserts 15 are secured in the right-handed insert seat 12 of each of the insert seat pairs 10a–h by means of the wedges 20 operating in the manner described with respect to FIG. 4. In FIG. 5B, the mounting screws 22 of each of the wedges 20 are turned counterclockwise in order to withdraw the wedges 20 from the wedge receiving recesses 18 disposed between the seats in each of the insert seat pairs 10a–h. After each of the mounting screws 22 has been unscrewed a sufficient distance, each of the indexable wedges 20 is turned 180°, and each of the inserts 15 is withdrawn from the right-handed seat 12 of each of the insert pairs 10a–h and inserted into the left-handed seat 14 of each pair. While this operation may be performed by unscrewing the mounting screws 22 until they completely disengage from the threaded bores 56 in the cutter body 3, the distal end of the mounting screws 22 may alternatively be made long enough so that 180° wedge rotation and insert switching operations may be made without completely disengaging the mounting screws 22 from the cutter body 3. After the positions of the inserts 15 and the wedges 22 have been changed as is indicated in part by FIG. 5B, the mounting screws 22 are then again turned clockwise in order to seat the wedges 20 into the wedge receiving recesses 18, which in turn has the effect of wedgingly securing each of the inserts 15 into the left-handed insert seats as shown. The equal but opposite orientation of the clamping surfaces 38 of the right and left-handed seats 12, 14 of each pair 10a–h allows the wedge 20 to be rotated and to clampingly and wedgingly engage each of the inserts 15 in the left-handed insert seats 14 in exactly the same manner that they were engaged within the right-handed insert seats 12. In both cases, the clamping and wedging surface 50 located on the offset portion 52 of the back end 48 of the wedge 20 pushes off of the clamping surface 38 of the unused insert seat of each pair in order to securely fasten an insert 15 into place in the opposing seat.

It should be understood that each mounting screw 22 must secure a wedge 20 to the milling cutter body 3. Therefore, as a minimum, each mounting screw 22 must capture a wedge 20 and urge the wedge 20 toward the surface 16 of the cutter body 3. To accomplish this, while not illustrated, the screw 22 could have a screw head that would engage the wedge 20 and a shaft that would thread into the surface 16. In this fashion, there would be no need to have a threaded bore within the wedge 20. Furthermore, there would be no need to use a double-threaded screw. However, some mechanism may be required to disengage the wedge 20 from the cutter body 3.

Throughout this discussion, the wedge 20 has been used to secure an insert 15 in either the right or left-handed insert seat 12, 14. As an alternative, it is possible to place an insert into a nest and secure the insert/nest combination against the right or left-handed seat 12, 14 using the wedge 20.

While this invention has been described with respect to a single preferred embodiment, numerous variations, modifications, and improvements will occur to persons of ordinary skill in the art. All such variations, modification, and improvements are intended to be encompassed within the scope of this invention, which is limited only by the claims appended hereto.

What is claimed is:

1. A milling cutter for cutting a workpiece in both right and left handed rotary directions, comprising:

a rotatable cutter body having at least one pair of adjacent insert seats, including a first seat for receiving an insert in a right-handed cutting orientation and a second seat for receiving an insert in a left-handed cutting orientation;

an indexable wedge for clamping an insert in either said first or second seat of said pair of insert seats, said wedge having a first end for wedgingly engaging an insert in either said first or second seat of said pair, and a second end for wedgingly engaging an opposing surface of said other seat, and means for detachably mounting said wedge to said cutter body in a clamping position with respect to an insert received in either said first or second seat of said pair.

2. The milling cutter defined in claim 1, wherein said second end of said wedge includes an engagement surface for engaging most of said opposing surface of said other seat in surface-to-surface contact.

3. The milling cutter defined in claim 2, wherein said opposing surfaces of said first and second seats are canted at equal and opposite angles with respect to a line intersecting or parallel to an axis of rotation of said cutter body, and said engagement surface of said wedge is canted at the same angle $\alpha 1$ as said opposing surface of said first seat when said wedge clamps an insert in said second seat, and is canted at the same angle $\alpha 2$ as said opposing surface of said second seat when said wedge is rotated 180° to clamp an insert in said first seat and received within said second seat.

4. The milling cutter defined in claim 1, wherein said mounting includes a single screw means engageable in a threaded bore located on said cutter body between said first and second insert seats.

5. The milling cutter defined in claim 1, wherein said cutter body has a generally circular periphery that includes a plurality of pairs of insert seats, each of which includes first and second seats for orienting an insert in a right-handed and a left-handed cutting orientation, respectively.

6. The milling cutter defined in claim 1, wherein said second end includes an offset portion that is partially complementary in shape to both said first and said second insert seats.

7. The milling cutter defined in claim 1, further comprising inserts all positioned against either the first or second seat of said pair of insert seats.

8. A milling cutter for cutting a workpiece in both right and left handed rotary directions, comprising:

a rotatable cutter body having a generally round periphery and a plurality of pairs of adjacent insert seats, each pair including a first seat for receiving an insert in a right-handed cutting orientation and a second seat for receiving an insert in a left-handed cutting orientation;

a plurality of indexable wedges for clamping an insert in either said first or said second seat of each of said pairs of seats, wherein each of said wedges clamps an insert into said first seat of its respective seat pair when oriented in a first position, and into said second seat of its respective seat pair when rotated 180° into a second position, and means for detachably mounting each of said wedges to said cutter body in said first and second clamping positions.

9. The milling cutter defined in claim 8, wherein each of said wedges includes a first end for wedgingly engaging an insert in either said first or said second seat of said pair, and a second end for wedgingly engaging a surface of said other seat.

10. The milling cutter defined in claim 9, wherein the second end of each of said wedges includes an offset portion that is partially complementary in shape to both said first and said second seats of said pair.

11. The milling cutter defined in claim 9, wherein said second end of said wedges includes an engagement surface for engaging most of said opposing surface of said other seat in surface-to-surface contact.

12. The milling cutter defined in claim 11, wherein said opposing surfaces of said first and second seats are canted at equal and opposite angles α1, α2 with respect to a line intersecting or parallel to an axis A of rotation of said cutter body, and said engagement surface of said wedges is canted at the same angle α1 as said opposing surface of said first seat when said wedges clamps an insert in said second set, and is canted at the same angle α2 as said opposing surface of said second seat when said wedge is rotated 180° to clamp an insert in said first seat and received within said second seat.

13. A milling cutter for cutting a workpiece in both right and left handed rotary directions, comprising:

a rotatable cutter body having a generally round periphery and a plurality of pairs of adjacent insert seats, each pair including a first seat for receiving an insert in a right-handed cutting orientation and a second seat for receiving an insert in a left-handed cutting orientation;

an indexable wedge for each of said pairs of insert seats, wherein each wedge clamps an insert in a first of said pair of seats when mounted in a first position between said sets and clamps an insert in a second of said pair of seats when remounted in a second position 180° with respect to said first position, a screw associated with each wedge for detachably mounting each wedge to said cutter body in said first and second clamping positions.

14. The milling cutter defined in claim 13, wherein each wedge includes a first end for wedgingly engaging an insert in either said first or second pair of seats, and a second end including an engagement surface for engaging most of an opposing surface of the other seat in surface-to-surface contact.

15. The milling cutter defined in claim 14, wherein said second end of each of said wedges includes an offset portion partially complementary in shape with and receivable into said first and second seats of said seat pair.

16. The milling cutter defined in claim 14, wherein said opposing surfaces of said first and second seats are canted at equal and opposite angles α1, α2 with respect to an axis A of rotation of said cutter body, and said engagement surface of said wedge is canted at the same angle α1 as said opposing surface of said first seat when said wedge clamps an insert in said second seat, and is canted at the same angle α2 as said opposing surface of said second seat when said wedge is rotated 180° to clamp an insert in said first seat and received within said second seat.

17. The milling cutter defined in claim 13, wherein said mounting includes a single screw means for each pair of insert seats having a first threaded end engageable in a threaded bore located in said cutter body between said seats, and a second threaded end of opposite handedness to said first threaded end engageable in a threaded bore located in said wedge such that said wedge is drawn toward or pulled away from said cutter body depending upon a direction of rotation of said screw.

* * * * *